(12) United States Patent
Payne et al.

(10) Patent No.: US 6,924,428 B1
(45) Date of Patent: Aug. 2, 2005

(54) DAMAGE PREVENTION SYSTEM FOR CABLES, PIPELINES AND THE LIKE

(76) Inventors: Brian L. Payne, 602 Coppertree Ct., Simi Valley, CA (US) 93065; Terry L. Walls, 951 Firestone Cir., Simi Valley, CA (US) 93065

( * ) Notice: Subject to any disclaimer, the term of this patent is extended or adjusted under 35 U.S.C. 154(b) by 0 days.

(21) Appl. No.: 10/384,059

(22) Filed: Mar. 7, 2003

(51) Int. Cl.[7] .............................................. H02G 9/00
(52) U.S. Cl. .......................... 174/37; 324/67; 405/157
(58) Field of Search ............................ 174/37; 324/66, 324/67, 326; 405/157; 116/DIG. 14, 203, 116/206; 340/540, 652

(56) References Cited

U.S. PATENT DOCUMENTS

| | | | | |
|---|---|---|---|---|
| 2,131,291 A | * | 9/1938 | Maust ......................... 340/679 |
| 3,581,703 A | * | 6/1971 | Hosack ...................... 116/67 R |
| 3,633,533 A | * | 1/1972 | Allen et al. .................... 174/37 |
| 4,623,282 A | * | 11/1986 | Allen ........................... 405/157 |
| 4,652,861 A | * | 3/1987 | Domes ..................... 340/539.1 |
| 4,654,639 A | * | 3/1987 | De Courville ............... 174/37 |
| 4,767,237 A | * | 8/1988 | Cosman et al. ................ 174/37 |
| 5,991,013 A | * | 11/1999 | Eslambolchi et al. ...... 356/73.1 |

* cited by examiner

Primary Examiner—Dean A. Reichard
Assistant Examiner—Adolfo Nino
(74) Attorney, Agent, or Firm—Robert M. Sperry

(57) ABSTRACT

A transmission line protection system comprising at least one signal carrying line buried adjacent the transmission line to be protected, means transmitting a signal through said signal carrying line, and means responsive to damage or severance of said signal carrying line to indicate that said signal carrying line has been damaged or severed and the location of the damage or severance.

8 Claims, 1 Drawing Sheet

DAMAGE PREVENTION SYSTEM FOR CABLES, PIPELINES AND THE LIKE

RELATED CASES

This invention is described in our provisional patent application Ser. No. 60/187,417, filed Mar. 7, 2000 and now expired and our utility application Ser. No. 09/633,564, filed Aug. 7, 2000 and now abandoned Feb. 17, 2002.

FIELD OF INVENTION

This invention relates to underground transmission systems, such as cables, pipe lines and the like and is particularly directed to improved means for detecting, locating and protecting such transmission lines against damage due to external forces and the like.

PRIOR ART

The use of underground transmission lines for delivering natural gas, crude oil, chemicals, petroleum products, data, telephone and televisions signals, etc, has become widespread. However, as a result, damage to such transmission lines by external forces, such as excavation, earthquakes, etc. has also become widespread. Approximately one-third of all underground transmission line breakages are caused by such external forces. Moreover, each such breakage results in substantial damage due to loss of service, spillage of hazardous materials, explosion, fire, etc. Actual costs run in the range of $500,000 per incident, with annual costs due to such damage running well into the millions. To reduce these problems, the federal government and most states require that the locations of most such underground transmission lines must be clearly marked and that anyone planning to excavate near such transmission lines to the owner of the transmission line. These steps reduce, but do not eliminate the problem and many such incidents still occur. Unfortunately, these laws are often not adhered to by contractors, are not enforced and/or the transmission lines are unmarked or mis-marked. Alternatively, the markings are removed or eroded by weather, animals, vandals, etc. Consequently, the locations of many transmission lines are unknown and persons digging in the vicinity are unaware of the presence of the transmission line until the transmission line has been damaged or broken and the damage has been done. If the line is broken, the owner may not be aware of the intrusion unless leak detection systems are installed to detect the leak and create an alarm. However, most of these systems do not report the location of the intrusion. If the line is damaged, but does not rupture, the intruder may simply refill the excavation without reporting the damage to the owner, which can result in subsequent leaks or rupture. This type of incident has resulted in some of our country's most tragic pipeline incidents. Furthermore, transmission line owners have recently become concerned about threats from terrrorist activity which could jeopardize major energy and data transportation. Thus, none of the prior art third party damage warning, detecting locating and protection systems have been entirely satisfactory.

BRIEF SUMMARY AND OBJECTS OF INVENTION

These disadvantages of the prior art are overcome with the present invention and an improved warning, detection and protection system is provided which positively identifies when and where a break, caused by external forces, is likely to occur or has occurred. Often, it will inform the transmission line owner prior to actual rupture of the transmission line, thereby enabling the transmission line operator to prevent rupture of the line and the ensuing damage.

The advantages of the present invention are preferably attained by providing an improved transmission line warning system comprising a signal carrying line buried adjacent but above the transmission line to be protected, means transmitting a signal through said signal carrying line, and means responsive to damage or severance of said signal carrying line to indicate that said signal carrying line has been damaged or severed and the location of the damage or severance.

Accordingly, it is an object of the present invention to provide improved means for protecting a transmission line from external forces.

Another object of the present invention is to provide means for protecting a transmission line which positively identifies when and where a break is likely to occur or has occurred. Often, it will inform the transmission line owner prior to actual rupture of the transmission line.

An additional object of the present invention is to provide means for protecting a transmission line which enables the transmission line operator to prevent rupture of the line and the ensuing damage or to minimize said damage by providing the damage location, thereby reducing emergency response times.

A specific object of the present invention is to provide an improved transmission line protection system comprising at least one signal carrying line buried adjacent but above and, optionally, to the sides or beneath the transmission line to be protected, means transmitting a signal through said signal carrying line or lines, and means responsive to damage or severance of said signal carrying line or lines to indicate that said signal carrying line or lines has been damaged or severed and the location of the damage or severance.

These and other objects and features of the present invention will be apparent from the following detailed description, taken with reference to the figures of the accompanying drawings.

DETAILED DESCRIPTION OF THE INVENTION

Figure 1:
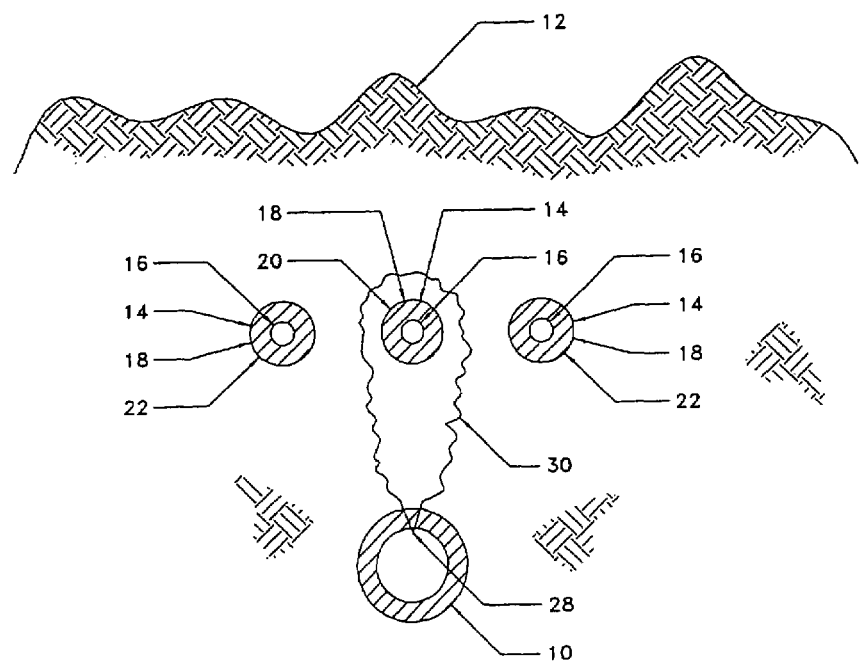
FIG. 1 is a section through the ground transverse to a transmission line and the protective devices of the present invention.

In that form of the present invention chosen for purposes of illustration, FIG. 1 shows a transmission line, indicated generally at 10, which is buried in the earth 12 and is protected by one or more protective devices 14, in accordance with the present invention, which are buried adjacent, but above and, optionally to the sides of or beneaqth, the transmission line 10 which is to be protected. The protective devices 14 each comprise at least one fiber optic signal carrying core 16 for carrying signals encased within an insulating sheath 18 which protects the core 16 against damage, severance, erosion or other damage by the surrounding earth or the fluids or creatures therein. As seen in FIG. 1, several of the protective devices 14 may be provided.

Figure 2:
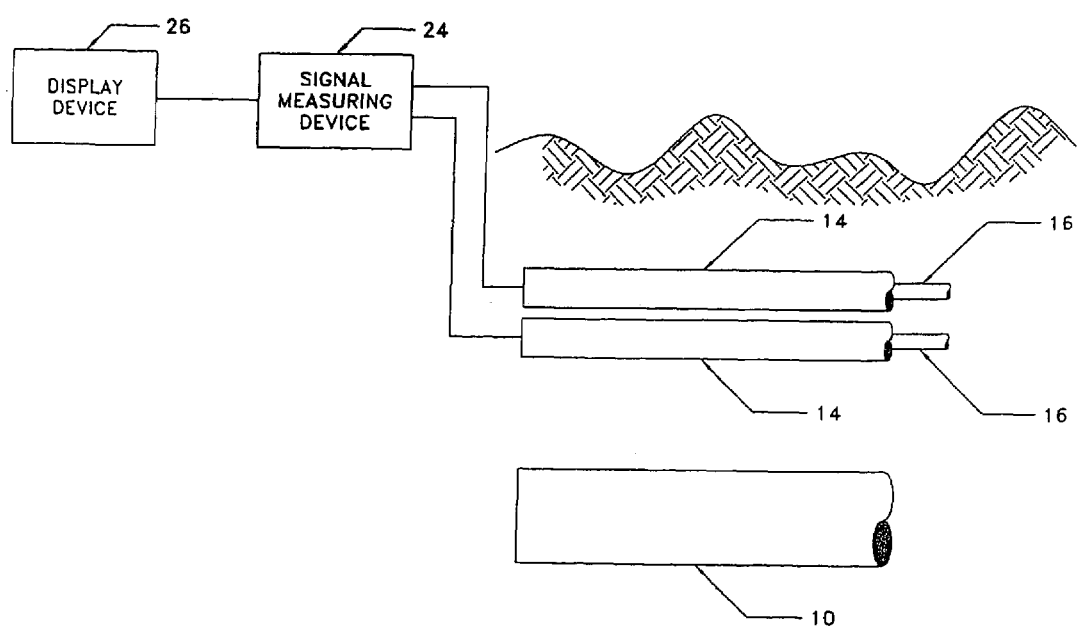
FIG. 2 is a diagrammatic representation showing the circuitry for one of the protective devices of the present invention.

If only one protective device 14 is used, it should be placed directly above and/or spaced laterally from the transmission line 10, as seen at 20 in FIG. 1. It should be understood that, where two or more of the protective devices 14 are installed, they operate independently and are not effected by the presence or absence of the adjacent devices. If two or more of the protective devices 14 are used, they should be spaced apart above, to the sides or beneath the transmission line 10, as seen at 22 and 22 in FIG. 1. Thus, if a person starts digging in the vicinity of the transmission line 10, they will first encounter one or more of the protective devices 14. As seen in FIG. 2, each of the signal carrying cores 16 is connected to a signal measuring device 24, which transmits signals along the core 16. If the core 16 becomes broken or or adequately damaged, as would occur if someone digging in the vicinity should damage or break the protective device 14, the signal measuring device 24 will detect the damage or break, determine the distance to the break, and provide an indication on the display device 26 showing that the break has occurred and the location of the break. Because the protective devices 14 are buried above the transmission line 10, the protective devices 14 will usually be damaged or severed and the operator of the transmission line will often be alerted in time to send someone to the site before the digging reaches the transmission line 10. Thus, rupture of the transmission line, with the attendant damage will most often be averted.

In use, one or more of the protective devices 14 will be buried above, and, optionally to the sides or beneath the transmission line 10 and a signal measuring device or devices 24 will be connected to send signals through the protective devices 14, as described above. In the event one or more of the protective devices 14 is damaged or severed, the signal measuring device 24 will provide an indication on the display device 26, enabling the operator of the transmission line to send someone to prevent further digging and to inspect for possible damage to the transmission line 10. Because the signal caarrying core 16 is a fiber optic, any rupture of break of the core 16, will cause signals carried thereby to be reflected back to the nearest one of the signal measuring devices 24, thereby indicating both the fact of the damgae and the distance from the signals measuring device 24 to the damage site. If desired, the protective sheath 18 may be formed of material which will dissolve in contact with the transmission line contents. Thus, if a leak should occur in the transmission line 10, as indicated at 28 in FIG. 1, the substance flowing through the transmission line 10 would leak out, as indicated at 30 in FIG. 1, and would damage or dissolve the protective sheath 18, causing the signal carrying core 16 to be damaged or break, which will be detected by the signal measuring device 24 which, in turn, would provide an indication on the display device 26 showing that the protective device had been damaged or severed and the location of the problem. The operator could then investigate and repair the leak in the transmission line 10 before any major leakage had occurred.

Obviously, numerous variations and modifications can be made without departing from the spirit of the present invention. Therefore, it should be clearly understood that the forms of the present invention described above and shown in the figures of the accompanying drawing are illustrative only and are not intended to limit the scope of the present invention.

What is claimed is:

1. A protection system for a transmission line containing a substance, said system comprising:
   at least one fiber optic signal-carrying line buried adjacent said transmission line to be protected,
   means transmitting an information-bearing signal through said signal-carrying line, and
   means responsive to damage of said signal carrying line to indicate that said signal carrying line has been damaged and the location of the damage,
   said signal-carrying line comprising a signal-carrying core encased within a protective sheath, and
   said protective sheath being formed of material which is damaged when exposed to the substance contained in the transmission line.

2. The system of claim 1 wherein:
   said signal carrying line carries electrical signals.

3. The system of claim 1 wherein:
   said signal carrying line carries optical signals.

4. The system of claim 1 wherein:
   said signal carrying line is buried directly above said transmission line.

5. The system of claim 1 wherein:
   a plurality of said signal carrying lines are provided spaced apart above said transmission line.

6. The system of claim 1 wherein:
   said signal carrying line is spaced laterally from said transmission line.

7. The system of claim 1 wherein:
   a plurality of said signal camming lines are provided spaced laterally from said transmission line.

8. The system of claim 1 wherein:
   said signal carrying line is spaced beneath said transmission line.

* * * * *